(12) United States Patent
Tanno et al.

(10) Patent No.: US 7,170,875 B2
(45) Date of Patent: Jan. 30, 2007

(54) CELL SEARCH METHOD FOR MOBILE STATION IN MOBILE COMMUNICATION SYSTEM AND MOBILE STATION

(75) Inventors: Motohiro Tanno, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1072 days.

(21) Appl. No.: 09/955,365

(22) Filed: Sep. 18, 2001

(65) Prior Publication Data
US 2002/0041579 A1    Apr. 11, 2002

(30) Foreign Application Priority Data
Sep. 19, 2000    (JP)    ............... 2000-283536

(51) Int. Cl.
H04B 7/216    (2006.01)
(52) U.S. Cl. ...................... 370/335; 370/350
(58) Field of Classification Search ............... 370/278, 370/328, 335, 337, 342, 347, 422, 441; 375/147, 375/149, 150
See application file for complete search history.

(56) References Cited
U.S. PATENT DOCUMENTS
5,930,366 A * 7/1999 Jamal et al. ............... 370/509

6,363,060 B1 * 3/2002 Sarkar ..................... 370/342
6,567,482 B1 * 5/2003 Popovic' .................. 375/343
6,678,313 B1 * 1/2004 Imaizumi et al. ........... 375/150
6,807,224 B1 * 10/2004 Takahashi et al. .......... 375/150

FOREIGN PATENT DOCUMENTS
EP    0825737 A1    2/1998
EP    0930723 A2    7/1999

* cited by examiner

Primary Examiner—Chau Nguyen
Assistant Examiner—Rhonda Murphy
(74) Attorney, Agent, or Firm—Workman Nydegger

(57) ABSTRACT

The present invention provides a cell search method that can reduce the power consumption of a mobile station. At a first step, averaging is executed over an averaging time T1, and slot boundaries are then detected. Next, as in conventional examples, a second and a third step are serially executed, and the averaging at the first step continues to be executed concurrently with the operation of the second and third steps. Correlation values for slots over an averaging time T1' are averaged, and the averaging is further executed using an already calculated first-step average correlation value, thereby calculating an average correlation value.

54 Claims, 15 Drawing Sheets

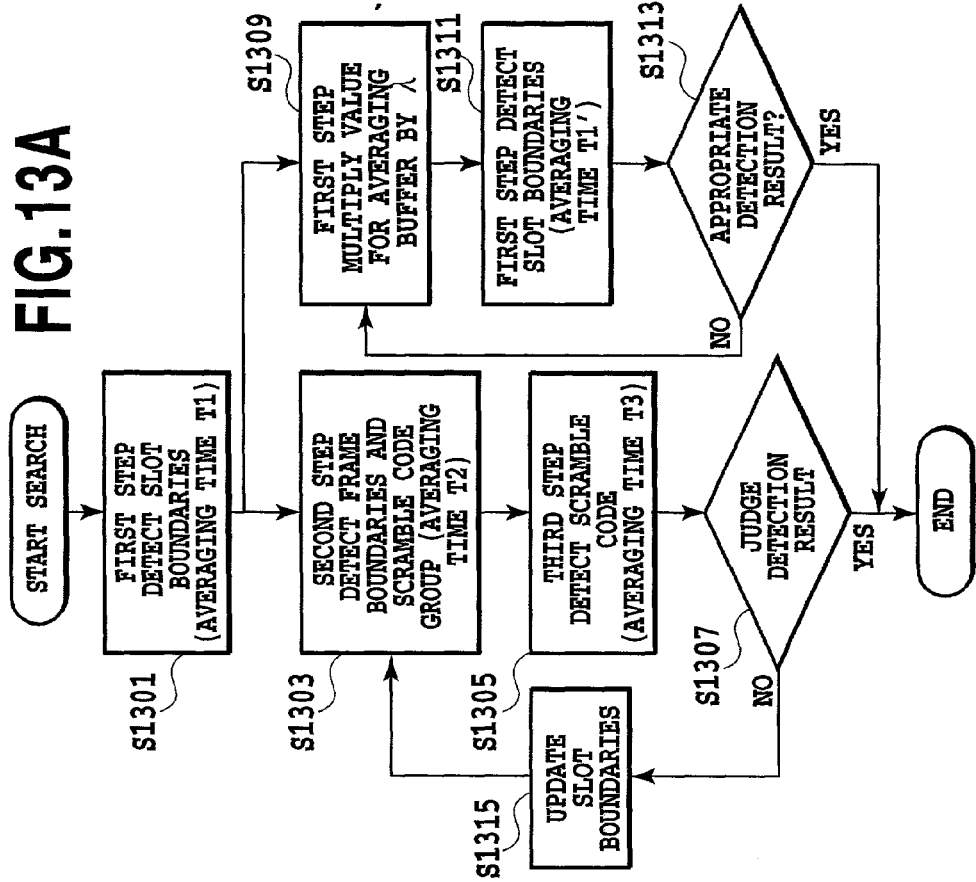
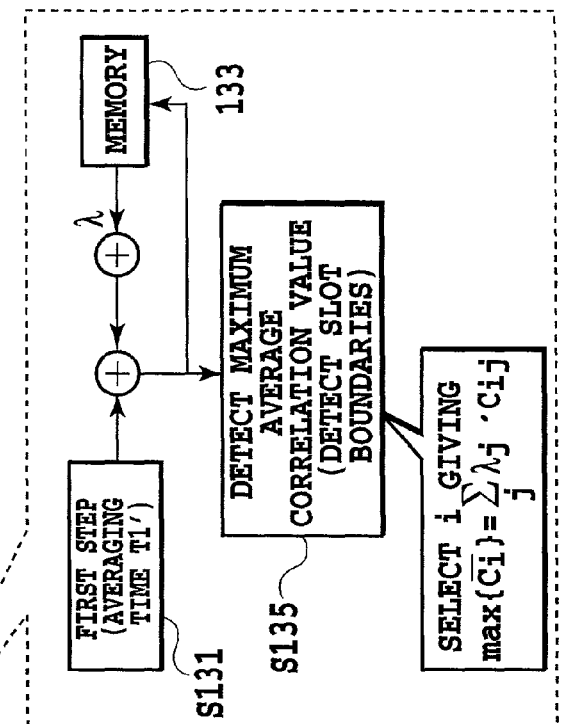
FIG.13A
FIG.13B

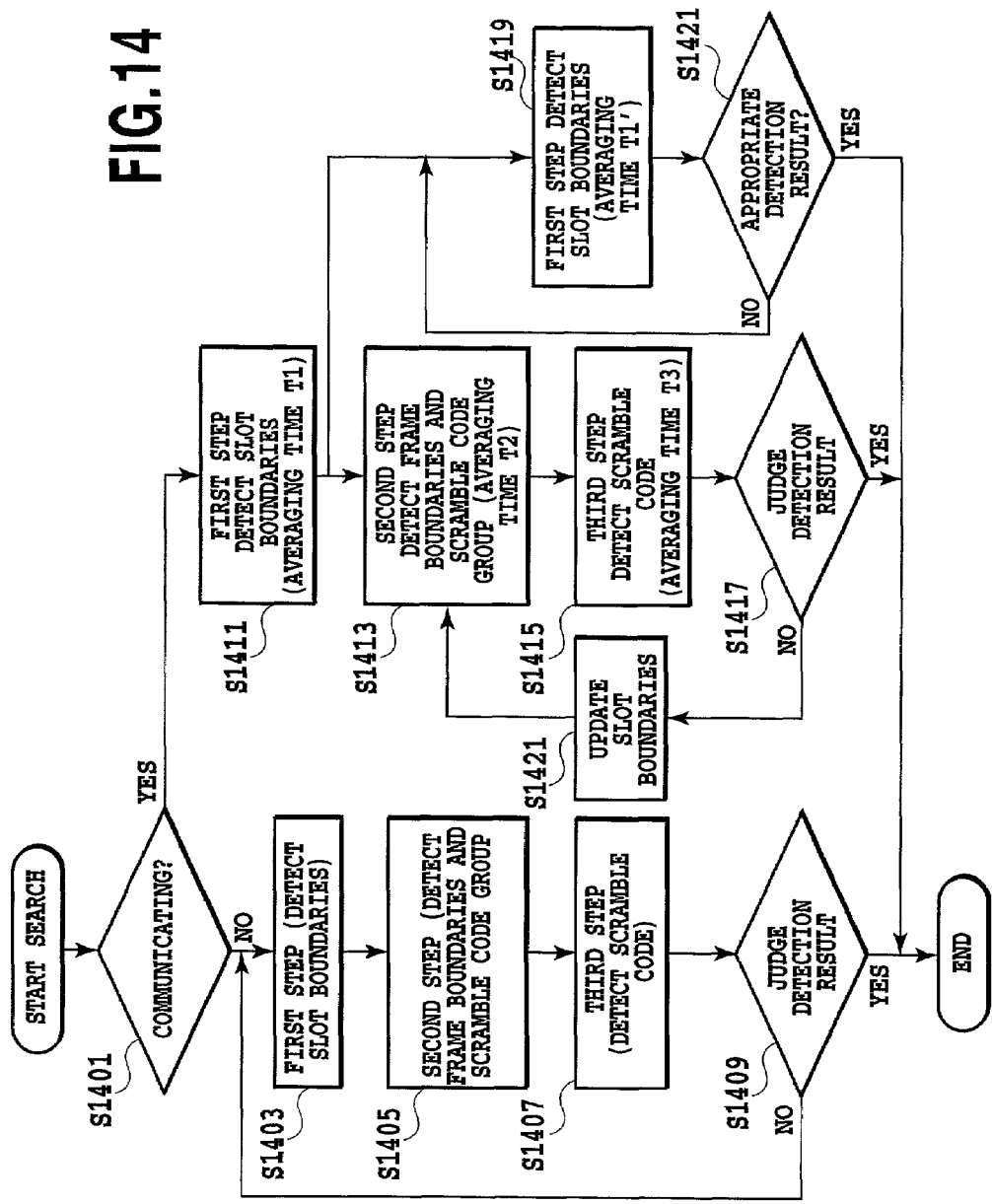

CELL SEARCH METHOD FOR MOBILE STATION IN MOBILE COMMUNICATION SYSTEM AND MOBILE STATION

This application claims priority under 35 U.S.C. 119 to Patent Application No. 2000-283536 filed Sep. 19, 2000 in Japan, the content of which is incorporated hereinto by reference.

BACKGROUND OF THE INVENTION

1. Field of the Invention

The present invention relates to a cell search method in a mobile communication system and a mobile station, and more specifically, to a cell search method for a mobile station in a CDMA (Code Division Multiple Access) mobile communication system and a mobile station, the method comprising a three-step cell search method of continuing to execute a first step during a second or third step concurrently therewith.

2. Description of the Related Art

In a mobile communication system based on the CDMA method, if a mobile station communicates with a base station or measures power received from a base station, it must detect frame boundaries and a scramble code in a down signal from the base station. This is called "cell search".

The cell search method essentially comprises descrambling the signal at all possible scramble codes with all possible timings. Then, a timing and a scramble code is selected with which a correlation coefficient obtained as a result of despreading with spreading codes used is largest, thereby making it possible to detect frame boundaries and the scramble code for the base station. This method, however, requires a large amount of time for the cell search. Thus, to increase the speed of the cell search, a method is used in which the base station transmits each slot through two synchronization channels: a PSCH (Primary Synchronization CHannel) and an SSCH (Secondary Synchronization CHannel) (refer to 3GPP Technical Specification 25.211).

FIG. 1 shows a configuration of a down channel relating to the cell search. This down channel relates to the cell search in the W-CDMA method (refer to 3GPP Technical Specification 25.211), which is representative of the CDMA mobile communication method. On a primary synchronization channel, a spreading code PSC (Primary Synchronization Code) is used which is common to all cells and slots, and the signal is transmitted in accordance with slot cycles. On a secondary synchronization channel, different spreading codes $SSC_0$ to $SSC_{n-1}$ (Secondary Synchronization Codes) are used for the respective slots, and one frame constitutes a spreading code sequence and is repeatedly and cyclically transmitted. Different spreading code sequences are used for respective cells and are correlated with scramble code groups to which scramble codes used by the base station belong.

FIG. 2 shows a conventional three-step cell search method.

A mobile station first detects slot boundaries (step S201). On the primary synchronization channel, the spreading code PSC, which is common to all the cell and slots, is used. The mobile station inputs a received signal to a matched filter corresponding to this spreading code PSC, and executes averaging over a plurality of slots in order to reduce the adverse effects of noise and interference. Then, a timing with which an average correlation coefficient is largest is selected to detect slot boundaries. This operation will be hereinafter called a "first step".

Next, frame boundaries and a scramble code group are detected (step S203). On the secondary synchronization channel, the different spreading codes are used for the respective slots, and a spreading code sequence of these codes constitutes one frame. The spreading code sequence is repeated in accordance with frame cycles, and different spreading code sequences are used for the respective cells. These spreading code sequences are correlated with respective groups of scramble codes so as to allow the scramble codes to be subsequently detected easily. Since the slot boundaries have been detected at the first step, the mobile station can calculate a transmission timing on the secondary synchronization channel.

The mobile station then despreads the received signal using the calculated timing and the spreading codes SSC. It then averages correlation output coefficients corresponding to all possible frame boundaries and SSC sequences, and selects a timing and an SSC spreading code sequence with which the average correlation coefficient is largest. The mobile station thus detects the frame boundaries and a scramble code group. This operation will be hereinafter called a "second step".

The mobile station further detects a scramble code (step S205). The mobile station, which has detected the frame boundaries and the scramble code group during the second step, finally receives the signal, in which the respective cells are subjected to different scramble code, through a common pilot channel and determines which of the scramble codes of the scramble code group equals that of the signal. Since the frame boundaries have already been detected, the phase of the scramble code can be calculated.

Since the spreading code for the common pilot channel is common to all the cells, essentially all the scramble codes within the group is used to descramble the signal, and the spreading code for the common primary channel is used to despread the signal. Then, these operations are performed over a plurality of symbols with the results averaged, and a scramble code is selected with which the average correlation coefficient is largest. This operation will be hereinafter called a "third step".

The mobile station determines whether or not the detected frame boundaries and scramble code are correct (step S207). If it is determined that they are correct, then the cell search is ended. Otherwise, the cell search is restarted from the first step. Whether or not the frame boundaries and scramble code are correct is determined by comparing these values with referential values.

In the conventional three-step cell search method, the process of the above described first, second, and third steps are serially executed to determine whether or not the detection results, that is, the frame boundaries and the scramble code are correct. If it is not determined that the detection results are correct, then memories for the respective steps are initialized, and the cell search is restarted from the first step. The above operation is repeated until the correct frame boundaries and scramble code are detected.

The power consumption of the mobile station can be reduced by shortening the time required for the mobile station to execute the cell search. Further, if the time required for the mobile station to execute the cell search is shortened, then the handover speed is increased to achieve more smooth and stable communications. Moreover, prompt and accurate selection of proper cells enables communications to be executed with a minimum required transmission power, thereby reducing the power consumption during the communication of the mobile station, while increasing the system capacity.

In the conventional three-step cell search method, however, the operations at the first to third steps are serially performed to determine that the cell search must be reexecuted, on the basis of only the determination for the detection results. Thus, the timing with which the need to reexecute the cell search is determined tends to be delayed.

In particular, with much noise or interference, there is a strong probability of a failure to detect the correct slot boundaries at the first step. If the detection fails at the first step, the operations at the second and third steps will be based on the incorrect slot boundaries and will thus be useless. Thus, the duration of the cell search disadvantageously increases.

SUMMARY OF THE INVENTION

The present invention is provided in view of the above problems, and it is an object thereof to provide a cell search method for a mobile station in a mobile communication system, the method comprising a three-step cell search method of continuing to execute a first step, that is, reception through the primary synchronization channel and a primary averaging process, during a second and a third steps, and further executing secondary averaging also using the results of a previous first step, thereby increasing the detection accuracy, reducing the power consumption of the mobile station, providing smooth and stable communications, and increasing the system capacity.

To attain this object, a first aspect of the present invention provides a cell search method for a mobile station in a mobile communication system, the method comprising a step of despreading a received signal with a spreading code common to all slots and detecting first slot boundaries on the basis of a first average correlation value calculated at intervals of first averaging time, a step of despreading the received signal with different spreading codes for the respective slots on the basis of the detected first slot boundaries and detecting frame boundaries and a scramble code group on the basis of a second average correlation value, a step of descrambling a common pilot signal on the basis of the detected frame boundaries and scramble code group, and detecting a scramble code on the basis of a third average correlation value, a step of detecting, concurrently with the step of detecting the frame boundaries and the scramble code group or the step of detecting the scramble code, second slot boundaries on the basis of a fourth average correlation value calculated through primary averaging executed at intervals of second averaging time, a step of determining whether or not the detected frame boundaries and scramble code are correct, and a step of repeating the process starting from the step of detecting the frame boundaries and the scramble code group on the basis of the detected second slot boundaries, if the incorrectness of the frame boundaries or the scramble code is determined.

A second aspect of the present invention provides a cell search method for a mobile station in a mobile communication system, the method comprising a step of despreading a received signal with a spreading code common to all slots and detecting first slot boundaries on the basis of a first average correlation value calculated at intervals of first averaging time, a step of despreading the received signal with different spreading codes for the respective slots on the basis of the detected first slot boundaries and detecting frame boundaries and a scramble code group on the basis of a second average correlation value, a step of descrambling a common pilot signal on the basis of the detected frame boundaries and scramble code group, and detecting a scramble code on the basis of a third average correlation value, a step of detecting, concurrently with the step of detecting the frame boundaries and the scramble code group or the step of detecting the scramble code, second slot boundaries on the basis of a fourth average correlation value calculated through primary averaging executed at intervals of second averaging time, and a step of suspending the step of detecting the frame boundaries and the scramble code group or the step of detecting the scramble code and repeating the process starting from the step of detecting the frame boundaries and the scramble code group on the basis of the second slot boundaries detected during a present search, if the detected second slot boundaries are different from the second slot boundaries detected during a last cell search.

Here, the second averaging time is different from the first averaging time.

Here, the first averaging time is longer than the second averaging time.

The repeating step can further include a step of comparing the time elapsed since the start of the step of detecting the first slot boundaries with a predetermined upper limit value and ending the repetition if it is determined as a result of the comparison that the elapsed time exceeds the upper limit value.

Alternatively, the repeating step can further include a step of comparing the number of times that the frame boundaries and the scramble code have been detected with a predetermined upper limit value and ending the repetition if it is determined as a result of the comparison that the number of times exceeds the upper limit value.

Moreover, the step of detecting the second slot boundaries can calculate a fifth average correlation value by executing secondary averaging on the basis of the first average correlation value and the already calculated fourth average correlation value, and can detect second slot boundaries on the basis of the calculated fifth average correlation value.

Here, the secondary averaging can be a process of carrying out averaging after weighting the first average correlation value and the already calculated fourth average correlation value.

Here, the weighting values are adaptively different from each other.

The correspondence between the weighting value and the first average correlation value may be such that the more previously the first average correlation value is calculated relative to the time of the secondary averaging, the smaller the weighting value is.

Here, a rate at which the weighting value decreases can increase consistently with a movement speed of the mobile station.

Further, the secondary averaging is a process of carrying out averaging after multiplying the first average correlation value and the already calculated fourth average correlation value by respective forgetting factors.

Here, values of the forgetting factors are adaptively different from each other.

Here, the value of the forgetting factor decreases consistently with the movement speed of the mobile station.

The method further comprises a step of determining a state of the mobile station, and the repeating step is executed if at the step of determining the state, it is determined that the mobile station is communicating.

A third aspect of the present invention provides a mobile station in a mobile communication system, the station comprising means for despreading a received signal with a spreading code common to all slots and detecting first slot boundaries on the basis of a first average correlation value calculated at intervals of first averaging time, means for despreading the received signal with different spreading codes for the respective slots on the basis of the detected first slot boundaries and detecting frame boundaries and a scramble code group on the basis of a second average correlation value, means for descrambling a common pilot signal on the basis of the detected frame boundaries and scramble code group, and detecting a scramble code on the basis of a third average correlation value, means for detecting second slot boundaries on the basis of a fourth average correlation value calculated by subjecting the received signal to primary averaging at intervals of second averaging time, and means for determining whether or not the detected frame boundaries and scramble code are correct, wherein if the determining means determines the incorrectness of the frame boundaries or the scramble code, the means for detecting the frame boundaries and the scramble code group detects the frame boundaries and the scramble code group on the basis of the detected second slot boundaries.

A fourth aspect of the present invention provides a mobile station in a mobile communication system, the station comprising means for despreading a received signal with a spreading code common to all slots and detecting first slot boundaries on the basis of a first average correlation value calculated at intervals of first averaging time, means for despreading the received signal with different spreading codes for the respective slots on the basis of the detected first slot boundaries and detecting frame boundaries and a scramble code group on the basis of a second average correlation value, means for descrambling a common pilot signal on the basis of the detected frame boundaries and scramble code group, and detecting a scramble code on the basis of a third average correlation value, means for detecting second slot boundaries on the basis of a fourth average correlation value calculated through primary averaging executed at intervals of second averaging time, and means for suspending the detection by the means for detecting the frame boundaries and the scramble code group or the means for detecting the scramble code, and detecting the frame boundaries and the scramble code group on the basis of the detected second slot boundaries, if the detected second boundaries are different from the first slot boundaries or the second slot boundaries detected during a last cell search.

Here, the second averaging time is different from the first averaging time.

Here, the first averaging time is longer than the second averaging time.

The mobile station can further include means for comparing the time elapsed since the start of the step of detecting the first slot boundaries with a predetermined upper limit value and ending the detection of the frame boundaries and the scramble code if it is determined as a result of the comparison that the elapsed time exceeds the upper limit value.

Alternatively, the mobile station can further include means for comparing the number of times that the frame boundaries and the scramble code have been detected with a predetermined upper limit value and ending the detection of the frame boundaries and the scramble code if it is determined as a result of the comparison that the number of times exceeds the upper limit value.

Moreover, the means for detecting the second slot boundaries can calculate a fifth average correlation value by executing secondary averaging on the basis of the first average correlation value and the already calculated fourth average correlation value, and can detect second slot boundaries on the basis of the calculated fifth average correlation value.

Here, the secondary averaging can be a process of carrying out averaging after weighting the first average correlation value and the already calculated fourth average correlation value.

Here, the weighting values are adaptively different from each other.

The correspondence between the weighting value and the first average correlation value may be such that the more previously the first average correlation value is calculated relative to the time of the secondary averaging, the smaller the weighting value is.

Here, a rate at which the weighting value decreases can increase consistently with a movement speed of the mobile station.

Further, the secondary averaging is a process of carrying out averaging after multiplying the first average correlation value and the already calculated fourth average correlation value by respective forgetting factors.

Here, values of the forgetting factors are adaptively different from each other.

Here, the value of the forgetting factor decreases consistently with the movement speed of the mobile station.

Further, the determining means can execute the determination if the mobile station is communicating.

According to the present invention, in the three-step cell search method, the first step continues to be executed during the second or third step concurrently therewith, so that if it is determined in connection with the detection results that the cell search must be executed again, the cell search must be started from the second step instead of the first step. Further, the continuation of the execution of the first step makes the averaging at the first step more effective. As a result, the present invention can achieve more accurate cell search in a shorter cell search time than the conventional cell search method.

Furthermore, if the slot boundaries detected at the first step, which continues to be executed during the second or third step, change, the cell search can be immediately restarted from the second step on the basis of the latest slot boundaries detected, which are more reliable, thereby achieving a more accurate cell search operation in a shorter cell search time.

Moreover, by setting an upper limit value for the number of times that the cell search is repeated or the cell search time, the unwanted repetition of the cell search can be prevented in a-situation where proper cells are not found. As a result, the cell search time can be reduced to lessen the power consumption of the mobile station.

Further, by carrying out the weighting or using the forgetting factors during the averaging at the first step, the averaging is made more effective while restraining the adverse effects of the variation of received power caused by fading or the like. Furthermore, by adaptively varying these weighting values or forgetting factors depending on the movement speed of the mobile station or the like, optimal averaging can be executed according to the instantaneous situation of a propagation path or the like, thereby enabling an effective cell search.

Moreover, according to the present invention, an algorithm for continuing to execute the first step during the second or third step only if the mobile station is communicating, thereby restraining the power consumption upon the turn-on of the power supply to the mobile station or during standby and enabling smooth and stable handover during communication.

The above and other objects, effects, features and advantages of the present invention will become more apparent from the following description of embodiments thereof taken in conjunction with the accompanying drawings.

BRIEF DESCRIPTION OF THE DRAWINGS

FIG. 13A is a flow chart showing an example of a method of using forgetting factors for the averaging at the first step according to the embodiment of the present invention;

FIG. 13B is a diagram showing an operation performed at step S1309 shown in FIG. 13A;

FIG. 14 is a flow chart showing an algorithm for continuing to execute the first step during a second or third step only if a mobile station according to the variation of the embodiment of the present invention is communicating.

DESCRIPTION OF THE PREFERRED EMBODIMENT

An embodiment of the present invention will be described below in detail with reference to the drawings.

Figure 1:
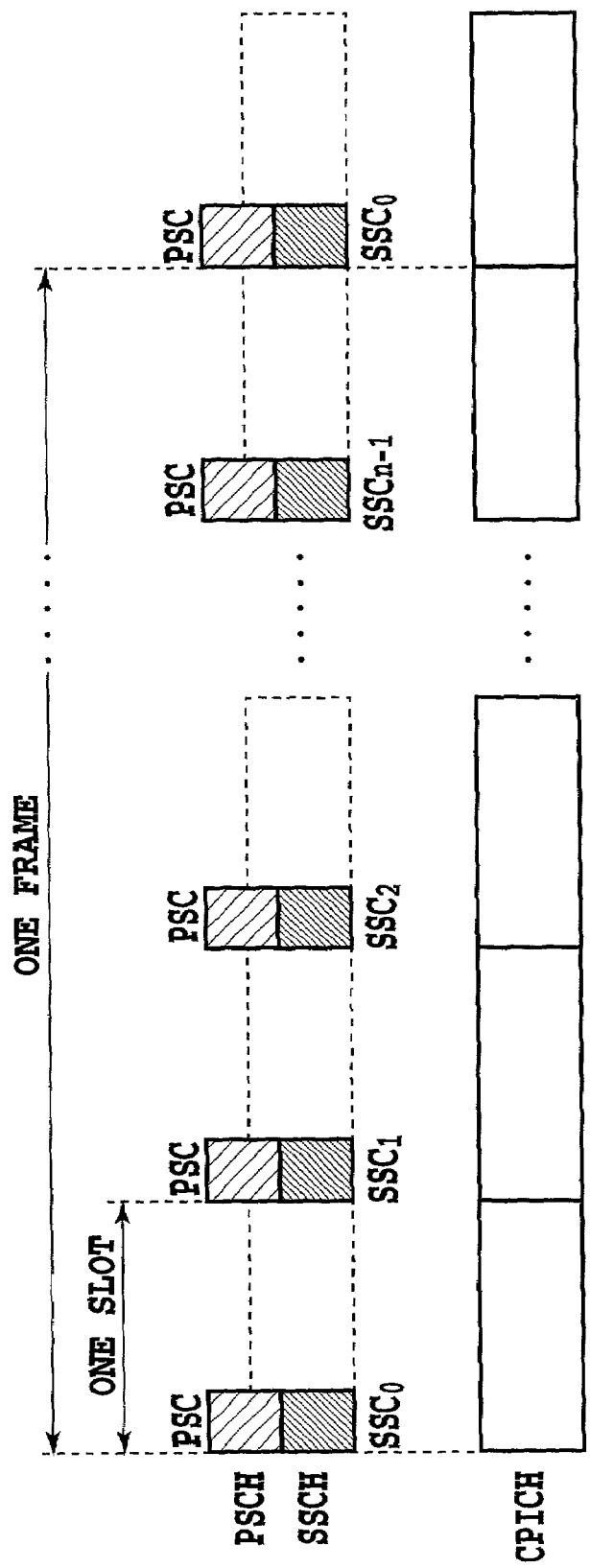
FIG. 1 is a schematic view showing a configuration of a down channel relating to the cell search.
Figure 2:
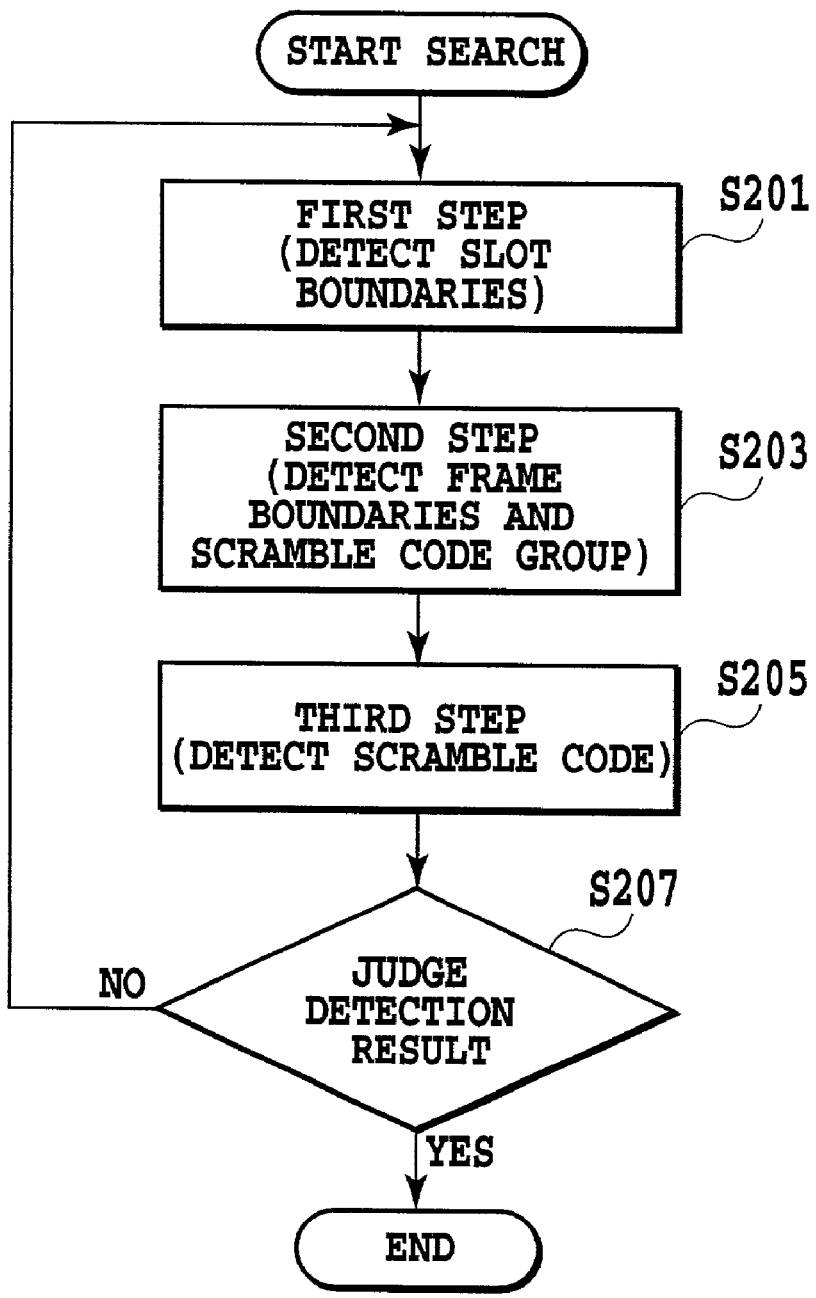
FIG. 2 is a diagram showing an algorithm for a conventional three-step cell search method.
Figure 3:
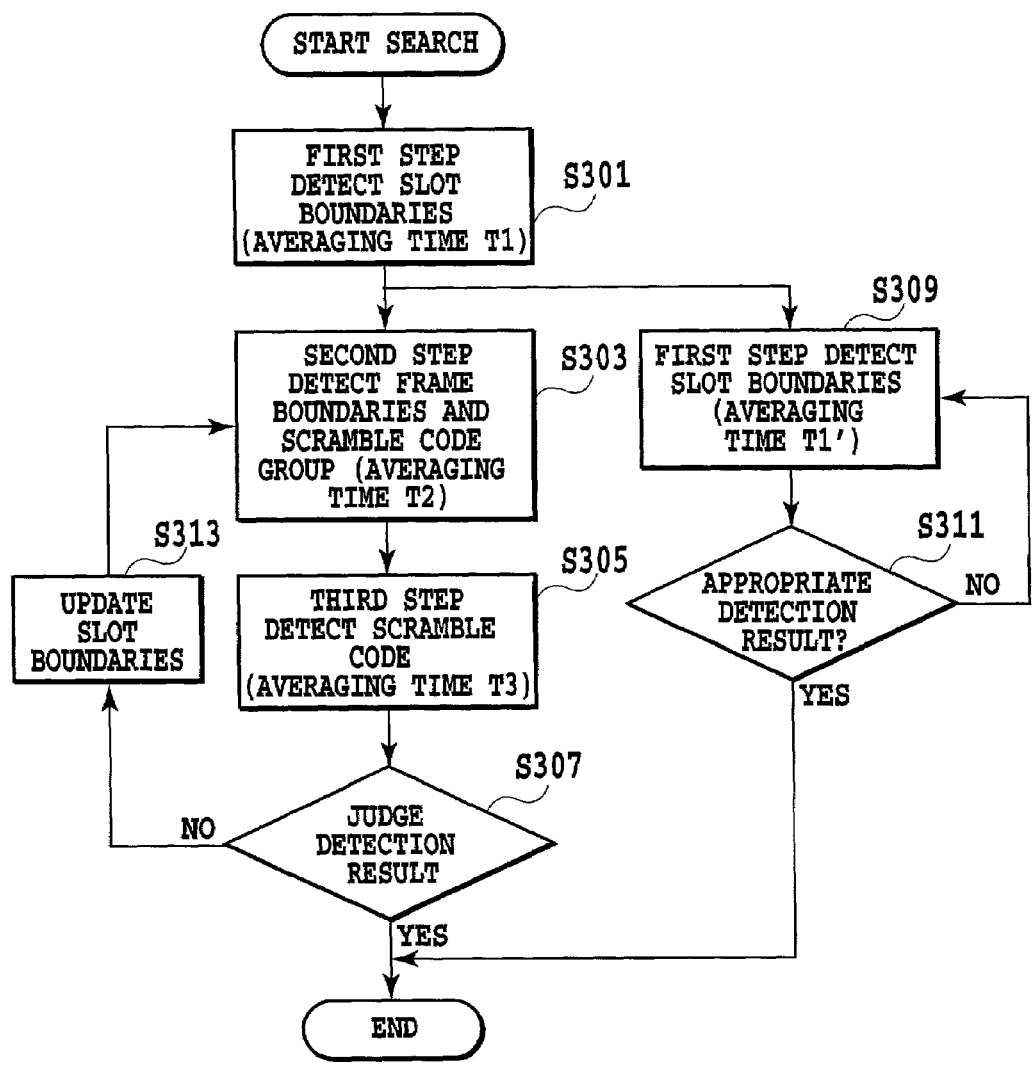
FIG. 3 is a flow chart showing a cell search method according to an embodiment.

FIG. 3 is a flow chart showing a cell search method according to this embodiment; it shows an algorithm for a cell search method of continuing to execute a first step during a second or third step.

At the first step, averaging is executed over an averaging time (first averaging time) T1, and slot boundaries are then detected (step S301). Next, as in the conventional example, the second and third steps are serially executed (steps 303 and 305), but the averaging at the first step continues to be executed concurrently with the operation of the second and third steps (step S309). Subsequently, the first-step averaging time (second averaging time) at step S309 is defined as T1'. In the first-step averaging at step S309, correlation values for slots over the averaging time T1' are averaged (primary averaging), and the averaging is further executed using an already calculated first-step average correlation value (secondary averaging), thereby calculating an average correlation value.

The already calculated first-step average correlation value, which is used for the secondary averaging, contains the average correlation value calculated at step S301 and the average correlation value already calculated at step S309, which is repeated. The secondary averaging makes the averaging more effective to allow slot boundaries to be detected more accurately at the first step.

Once the primary averaging over the time T1 and the secondary averaging over the time T1' has been completed, the maximum average correlation value is selected to detect slot boundaries. When the third step is completed, the result of the detection is judged (step S307). Here, it is determined whether or not frame boundaries detected at the second step and a scramble code detected at the third step are correct. If it is determined that the cell search must be reexecuted, then instead of returning to the first step, the slot boundaries are updated to the latest detection result (step S313), and the cell search is started from the second step using this result.

On the other hand, the concurrent first-step averaging is repeated until it is determined in connection with the detection results at step S307 that the correct frame boundaries and scramble code have been detected (step S311). The above operation is repeated until the cell search is repeated.

This operation eliminates the need to return to the first step when the cell search must be reexecuted. Further, the secondary averaging makes the averaging at the first step more effective. Consequently, a more accurate cell search can be achieved in a shorter time than in the conventional system.

Figure 4:
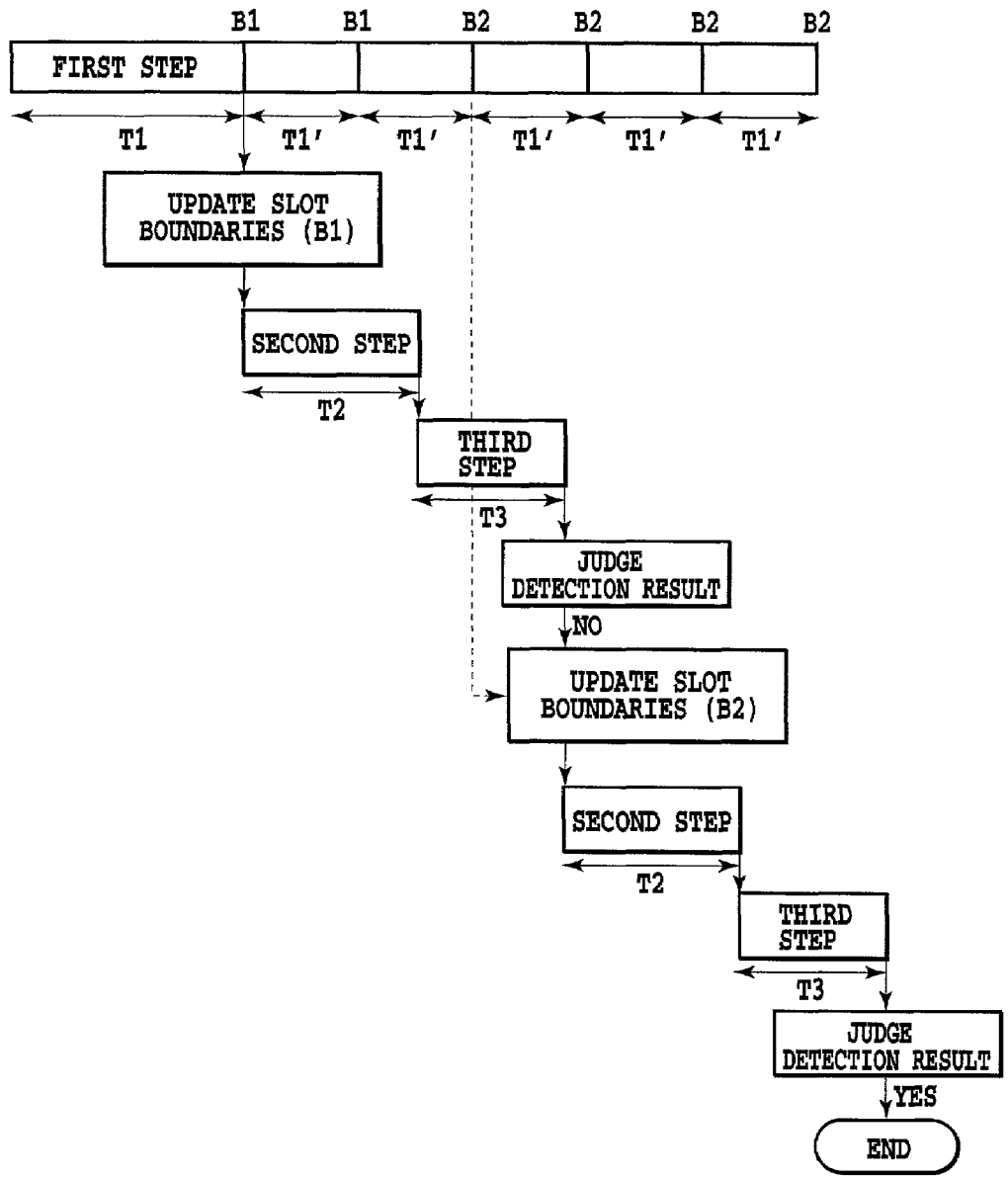
FIG. 4 is a diagram showing an example of an operational flow followed if the cell search is executed using the algorithm shown in FIG. 3.

FIG. 4 is a diagram showing an example of an operational flow followed if the cell search is executed using the algorithm shown in FIG. 3. At the first step, the averaging is executed over the averaging time T1. When slot boundaries B1 are detected, the operation of the second step is started, but the averaging at the first step continues to be executed during the averaging time T1'. Once the second step has been completed, the process shifts to the third step to subsequently judge the detection result.

In the example shown in FIG. 4, since it is determined in connection with the detection result that the cell search must be reexecuted, the cell search is restarted from the second step. At this time, as the slot boundaries change from B1 to B2 during the execution of the third step, the cell search is reexecuted with the slot boundaries changed to the latest detection result B2. Then, after the third step, the result of the detection is judged again. Since it is determined that the correct frame boundaries and scramble code have been detected, the cell search is completed.

Figure 5:
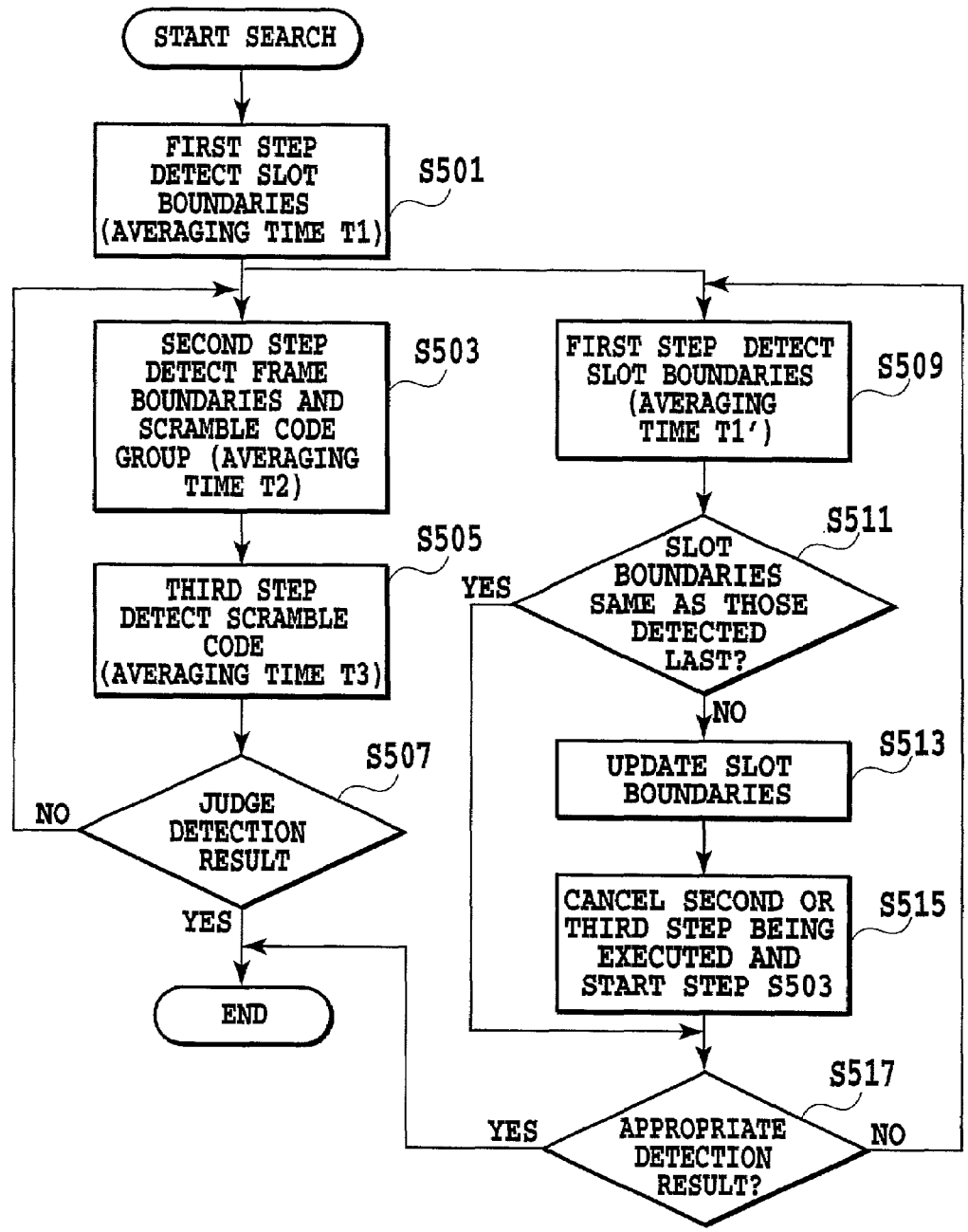
FIG. 5 is a flow chart showing another example of a cell search method according to the embodiment.

FIG. 5 is a flow chart showing another example of a cell search method according to this embodiment. Specifically, this figure shows an algorithm for a cell search method of executing the first step concurrently with the second or third step and immediately restart the cell search from the second step if the slot boundaries detected at the first step change. As in the last example, after the first step has been completed, the process proceeds to the second step, while the first step continues to be executed concurrently with the second step (steps S501, S503, and S509). At the concurrent first step, the result of the detection of the slot boundaries is updated at time intervals T1' (step S513). If the updated result is different from the result detected the time T1' ago (that is, the result of the detection during the last cell search), then the operation of the second or third step is suspended (step S515). The process then returns to the second step to reexecute the cell search on the basis of the value for the updated boundaries.

If the result of the detection at the first step is the same as that obtained the time T1' ago, then after the second step has been completed, the process shifts to the third step to detect a scramble code and then judge the detection result (step S507). If it is determined in connection with the detection result that the cell search must be reexecuted, the cell search is restarted from the second step. In this case, the slot boundaries have the same value as used in the last cell search. The averaging at the concurrent first step is repeated until it is determined at step S507 in connection with the detection result that the correct scramble code has been detected (step S517).

Thus, if the slot boundaries detected at the first step are different from that detected previously, the cell search is immediately reexecuted, thereby reducing the cell search time.

Figure 6:
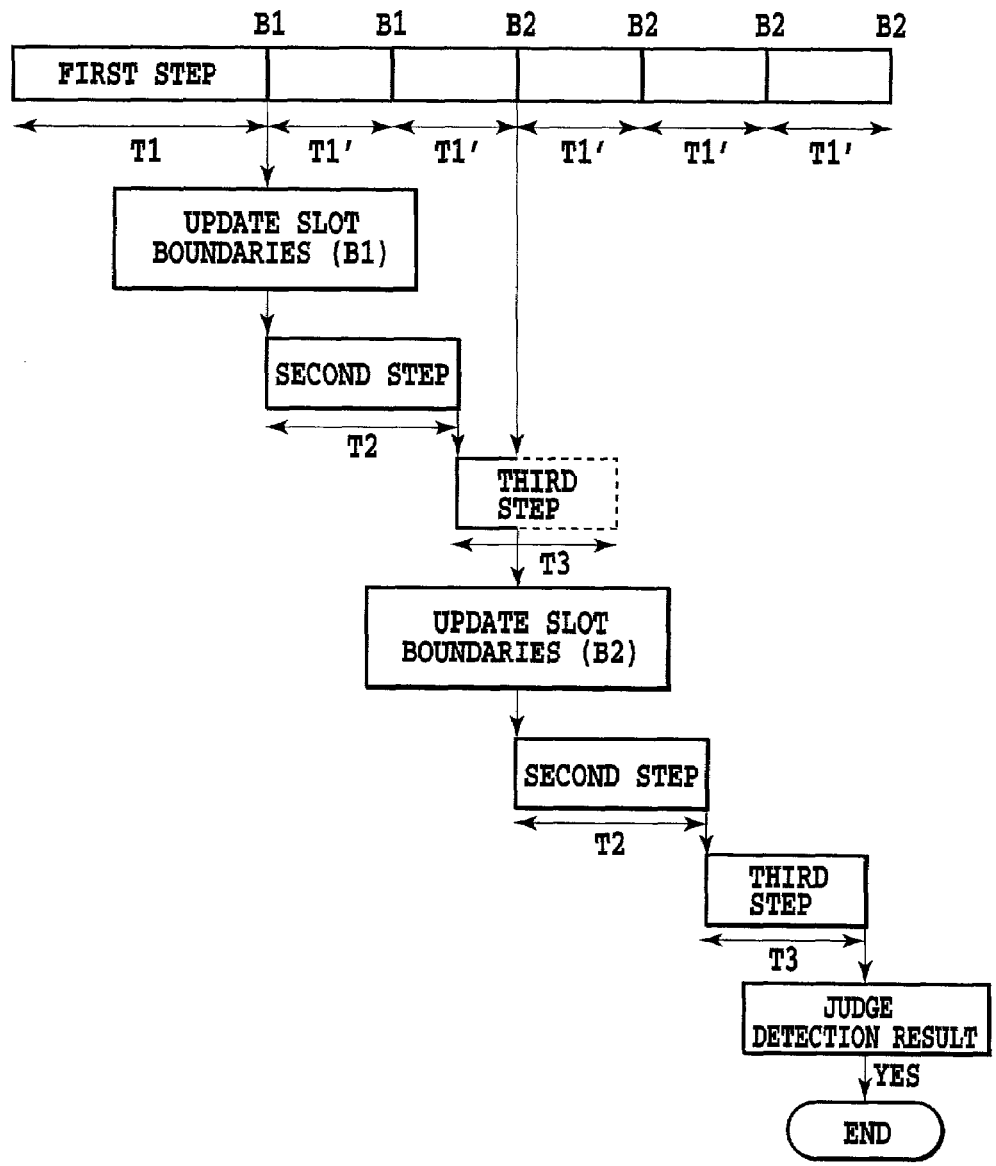
FIG. 6 is a diagram showing an example of an operational flow followed if the cell search is executed using the algorithm shown in FIG. 5.

FIG. 6 is a diagram showing an example of an operational flow followed if the cell search is executed using the algorithm in FIG. 5. At the first period, the averaging is executed over the averaging time T1. When slot boundaries are detected, the operation of the second step is started, while the averaging at the first step continues to be executed over the averaging time T1'. In the middle of the third step, the slot boundaries detected at the first step change from B1, a previous value, to B2, so that the third step is immediately suspended. The slot boundaries are updated to B2, the latest value, and the process returns to the second step to reexecute the cell search. Here, the operation of the suspended third step is shown by a broken line.

Subsequently, the cell search passes through the second step to the third step, and then continues to be executed because the result of the detection at the first step, which is being executed concurrently with the second or third step, remains unchanged (B2). Then, it is determined in connection with the detection result that the correct frame boundaries and scramble code have been detected, so that the cell search is completed. In this case, by setting the first averaging time T1 at the step S501 in FIG. 5 longer than the second averaging time T1' at step S509, the process can proceed to the second step after an output from the initial first step has been stabilized. Further, by setting the second averaging time T1' shorter than the first averaging time T1, the change in the detected slot boundaries can be promptly dealt with.

Figure 7:
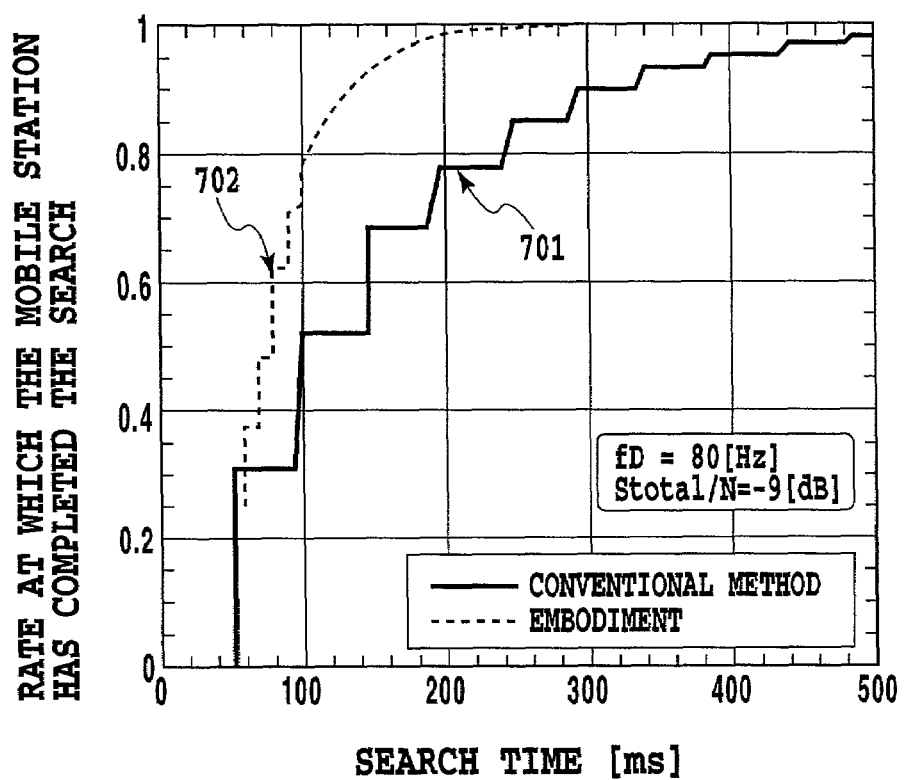
FIG. 7 is a graph showing a cell search time characteristic obtained if the cell search is executed using the algorithm shown in FIG. 5.

FIG. 7 is a graph showing the result of simulation; it shows a cell search time characteristic obtained if the cell search is executed using the algorithm in FIG. 5. The axis of abscissas indicates the search time, whereas the axis of ordinates indicates the rate at which the mobile station has correctly completed the search by the corresponding search time. It is assumed that fading has a maximum Doppler frequency (fD) of 80 [Hz] and that the ratio Stotal/N of the total received power from the base station to the sum of interference from other cells and thermal noise power is −9 [dB]. The figure shows that compared to the conventional method, shown by a solid line 701, the cell search method based on the algorithm of this embodiment, shown by a broken line 702, can sharply reduce the cell search time.

Figure 8:
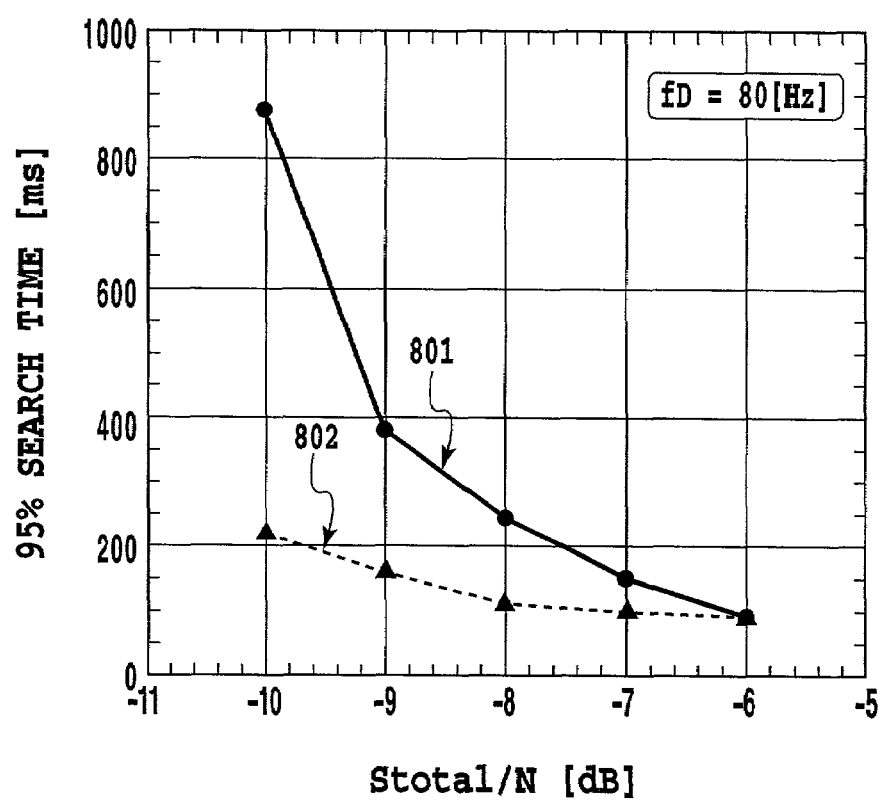
FIG. 8 is a graph showing a 95% cell search time characteristic obtained if the cell search is executed using the algorithm shown in FIG. 5.

FIG. 8 is a graph showing a 95% search time characteristic obtained if the cell search is executed using the algorithm in FIG. 5. This graph shows the ratio Stotal/N on the axis of abscissas and shows the time required for 95% of the users to correctly complete the cell search, on the axis of ordinates. This graph shows that the smaller the ratio Stotal/N is, the more significantly the cell search time based on the algorithm of this embodiment, shown by a broken line 802, is improved compared to the conventional method, shown by a solid line 801.

Figure 9:
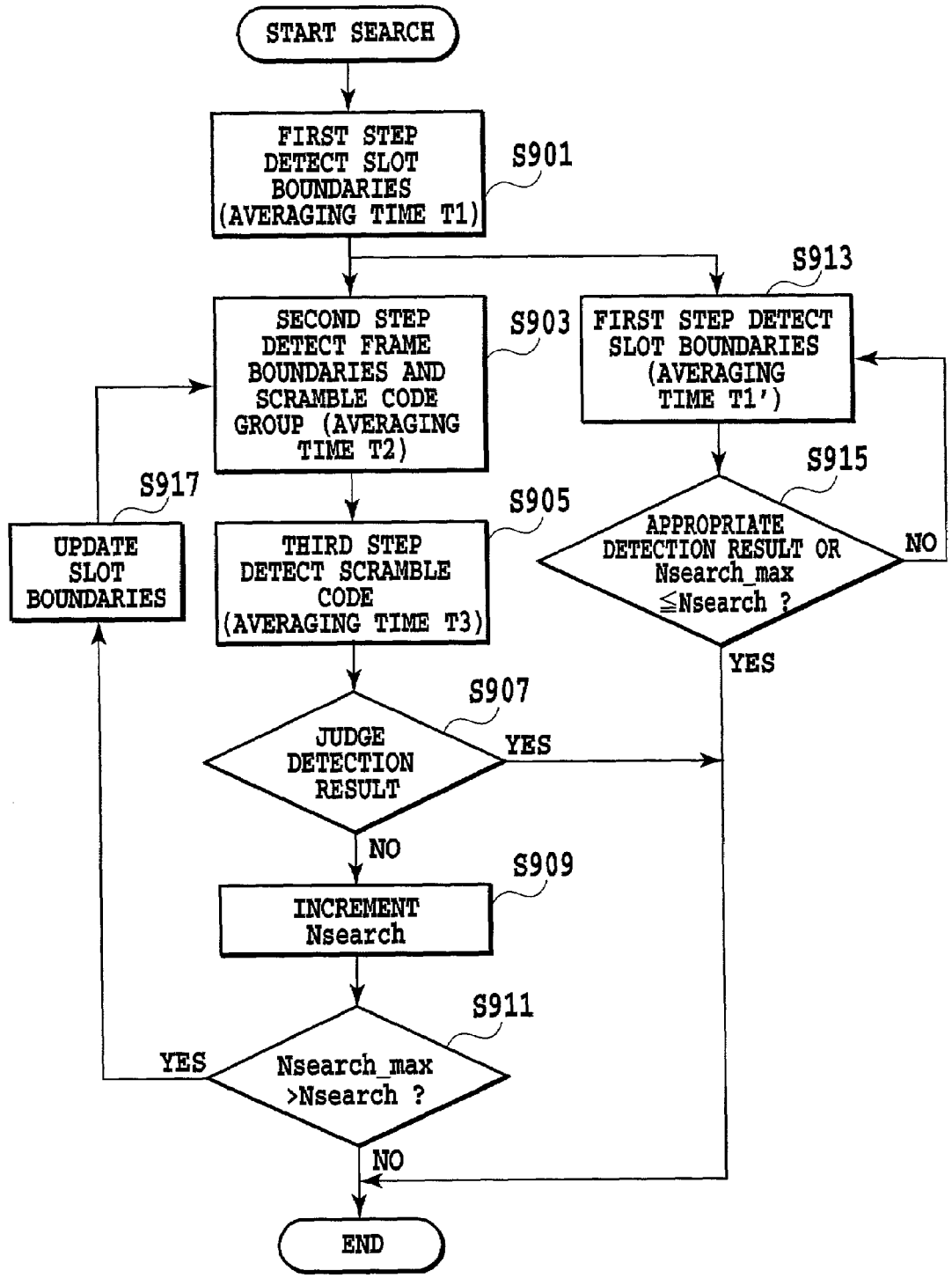
FIG. 9 is a flow chart showing an example of a cell search method of setting an upper limit on the number of times that the cell search is executed.

FIG. 9 is a flow chart showing an example of a cell search method of setting an upper limit on the number of times that the cell search is tried, for the algorithm in FIG. 3 according to this embodiment. The basic algorithm is the same as that shown in FIG. 3, but if it is determined at step S907 in connection with the detection result that the cell search must be reexecuted, after one cell search has been completed, the number Nsearch of times that the cell search is tried is incremented (step S909). Then, the number Nsearch is compared with a predetermined upper limit value Nsearch_max (step S911).

If the number Nsearch is larger than the value Nsearch_max, then the cell search is ended. At this time, however, the mobile station determines that no proper cells have been found, and reexecutes the cell search by changing conditions such as the frequency or determines that it is located out of service areas. This operation avoids repeating useless cell searches in spite of the absence of proper cells to thereby increase the cell search time or increasing the power consumption of the mobile station due to the extended cell search time.

Figure 10:
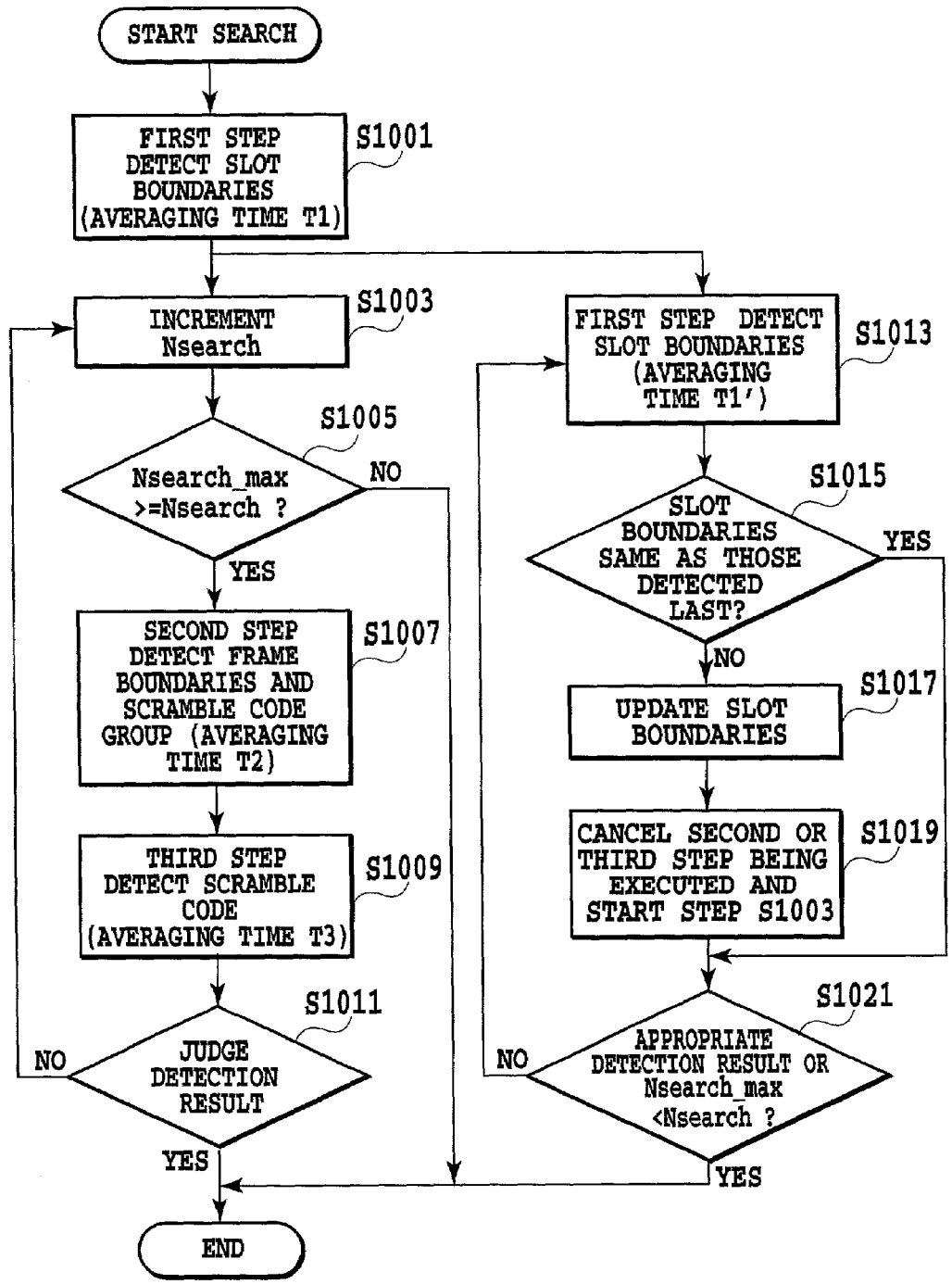
FIG. 10 is a flow chart showing an example of a cell search method of setting an upper limit on the number of times that the cell search is executed, for the algorithm in FIG. 5 according to a variation of the embodiment of the present invention.

FIG. 10 is a flow chart showing an example of a method of setting an upper limit on the number of cell searches in the case where the cell search is executed using the algorithm shown in FIG. 5. After the first step has been completed, the process proceeds to the second step, while the first step continues to be executed concurrently with the second step (steps S1001, S1007, and S1013). At the concurrent first step, the result of the detection of the slot boundaries is updated at time intervals T1' (step S1017). If the updated result is different from the result detected the time T1' ago, the slot boundaries are updated to the latest value, and the operation of the second or third step is then suspended (step S1019). The process then returns to the second step to reexecute the cell search on the basis of the updated slot boundaries.

If the result of the first-step detection at step S1013 is the same as that obtained the time T1' ago, then after the second step has been completed, the process shifts to the third step to detect a scramble code and then judge the detection result (step S1011). If it is determined in connection with the detection result that the cell search must be reexecuted, the cell search is restarted from the second step. In this case, the slot boundaries have the same value as used in the last cell search.

With this algorithm, the cell search may be suspended in the middle of the second or third step, and the cell search may be restarted from the second step. Accordingly, before the operation of the second step, the number Nsearch of search tries is incremented (step S1003), and the resulting number is compared with the predetermined upper limit Nsearch_max (step S1005). During this process, if the number Nsearch of tries is determined to exceed the upper limit Nsearch_max, the cell search is ended. The averaging at the first step, which is being executed concurrently at step S1013, is repeated until it is determined at step S1011 in connection with the detection result that the correct scramble code has been detected or that the number Nsearch exceeds the value Nsearch_max (step S1021).

Figure 11:
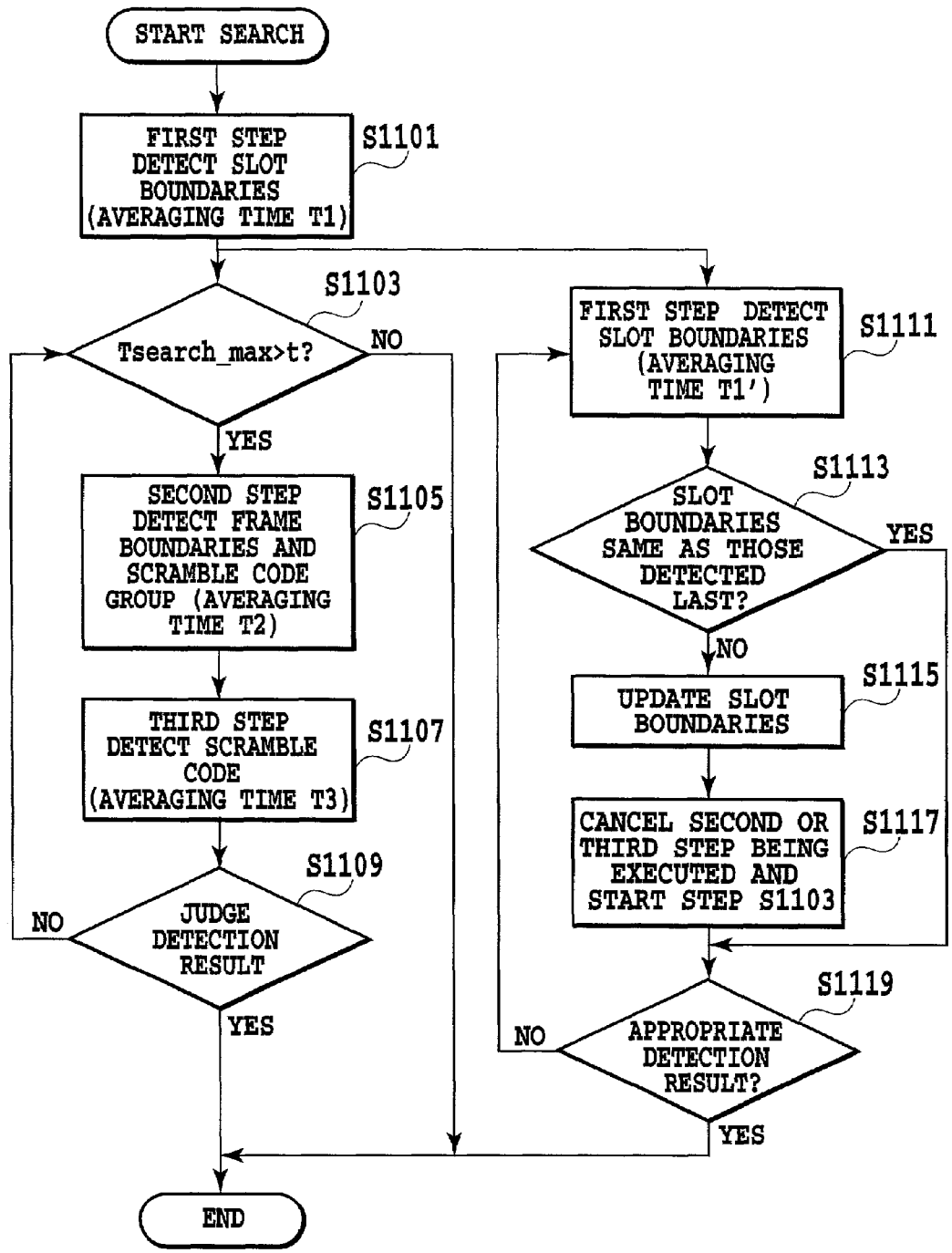
FIG. 11 is a flow chart showing an example of a cell search method of setting an upper limit on the number of times that the cell search is executed, for the algorithm in FIG. 5 according to the embodiment of the present invention.

FIG. 11 is a flow chart showing an example of a method of setting an upper limit on the cell search time in the case where the cell search is executed using the algorithm in FIG. 5. In this case, a predetermined upper limit is set on the cell search time but not on the number of cell searches. With the algorithm in FIG. 5, the cell search may be suspended in the middle of the second or third step, and the cell search may be restarted from the second step (step S515 in FIG. 5). Consequently, the number of cell searches is not always proportional to the cell search time. Thus, a predetermined upper limit Tsearch_max is set in advance. Then, the cell search time t is measured and compared with the value Tsearch_max (step S1103). During this process, if it is determined that the time t is equal to or larger than the upper limit value Tsearch_max, the cell search is ended. This enables the setting of a temporally fixed upper limit.

Figure 12A:
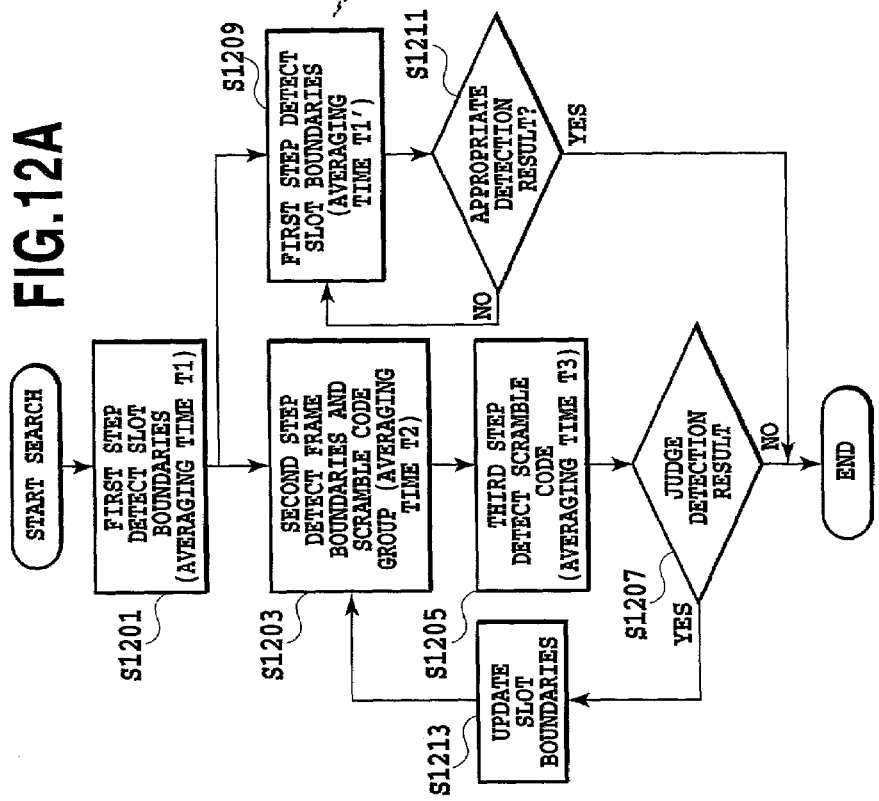
FIG. 12A is a flow chart showing an example of a method of carrying out weighting for averaging at a first step according to the embodiment of the present invention.
Figure 12B:
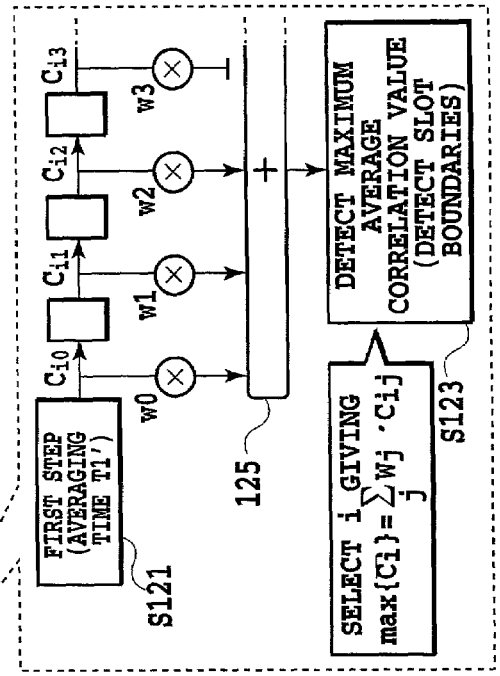
FIG. 12B is a diagram showing an operation performed at step S1209 shown in FIG. 12A.

FIG. 12A is a flow chart showing a method of carrying out weighting for the secondary averaging at the first step. As shown in FIG. 12A, at the first step, the averaging is executed with the averaging time T1 for the first time and with the averaging time T1' for the second and subsequent times (steps S1201 and S1209). Here, an operation performed at step S1209 is shown in FIG. 12B.

Average correlation values $C_{i0}$ to $C_{i3}$ calculated by the primary averaging at the first step, which is repeated at intervals of the averaging time T1', are each stored in a memory D. Then, the average correlation values $C_{i0}$ to $C_{i3}$ are weighted using weighting factors $W_0$ to $W_3$, and the weighted values are subjected to secondary averaging by an averaging device 125. Then, in the result of the secondary averaging, slot boundaries corresponding to a maximum average correlation value are detected (step S123). This makes the averaging more effective. In this case, the adverse effects of the variation of received power caused by fading or the like can be lessened by consistently reducing the weighting values corresponding to average correlation values calculated more previously relative to the time of the secondary averaging (for example, the time corresponding to the terminal of the slot used for the final primary averaging).

FIG. 13A is a flow chart showing a method of using forgetting factors for the averaging at the first step. As shown in FIG. 13A, the averaging is executed with the averaging time T1 for the first time and with the averaging time T1' for the second and subsequent times (steps S1301 and S1309). Here, an operation performed at step S1309 is shown in FIG. 13B. In the first-step primary averaging (step 131) at step S1309, the average correlation value is obtained at intervals of the time T1'. Each time the average correlation value is obtained, and a past average correlation value multiplied by a forgetting factor $\lambda$ ($0 \leq \lambda \leq 1$) is added to the present averaging result for the secondary averaging. As a result, slot boundaries corresponding to the maximum average correlation value are selected (step S135).

Further, this average correlation value is stored in a memory 133 and is used for the next detection of slot boundaries. The larger the factor $\lambda$ is, the more effective the averaging is because more previous averaging results are utilized. A too large forgetting factor, however, causes the mobile station to be easily affected by the variation of received power induced by fading or the like. Thus, by selecting the factor $\lambda$ considering the applicable area of the mobile communication system, slot boundaries can be detected after effective averaging.

The optimal value of the weighting or forgetting factor for the averaging varies depending on the movement speed of the mobile station or the like. Thus, for example, the movement speed of the mobile station is detected, and with a lower movement speed, a larger number of past averaging results are used, whereas with a higher movement speed, a smaller number of averaging results are used. That is, the rate at which the weighting factor is reduced is relatively increased consistently with the movement speed of the mobile station. By thus adaptively changing the weighting factor or the forgetting factor, optimal averaging can be achieved which is suitable for the present conditions.

FIG. 14 is a flow chart showing a method of changing the cell search method according to the state of the mobile station.

The state of the mobile station in connection with the cell search is roughly classified into three categories: power-on, standby, and communicating. The power-on and standby states require the power consumption to be minimized in order to increase the duration of batteries of the mobile station. For a mobile station that consumes a relatively large amount of power at the first step, the method of continuing to execute the first step throughout the cell search may impact the duration of the batteries. During communication, however, even such a mobile station transmits electric waves, so that a relatively small amount of power is used for the cell search. Therefore, during communication, the duration of the batteries is not impacted even if the first step continues to be executed during the second or third step.

Further, during communication, a fast and accurate cell search is required for achieving smooth handover. Furthermore, to subject a handover target cell to the cell search, this operation must be performed in an environment with a very high interference power because a signal from the communicating cell is viewed as interference. Thus, it is very effective to continue to execute the first step during the second or third step to thereby increase the speed and accuracy of the cell search.

Thus, it is determined whether or not the mobile station is communicating (step S1401). Then, the first step continues to be executed during the second or third step only if the mobile station is determined to be communicating (steps S1411 and S1419), thereby restraining an increase in the total power consumption of the mobile station, while increasing the speed and accuracy of the cell search during communication.

Figure 15:
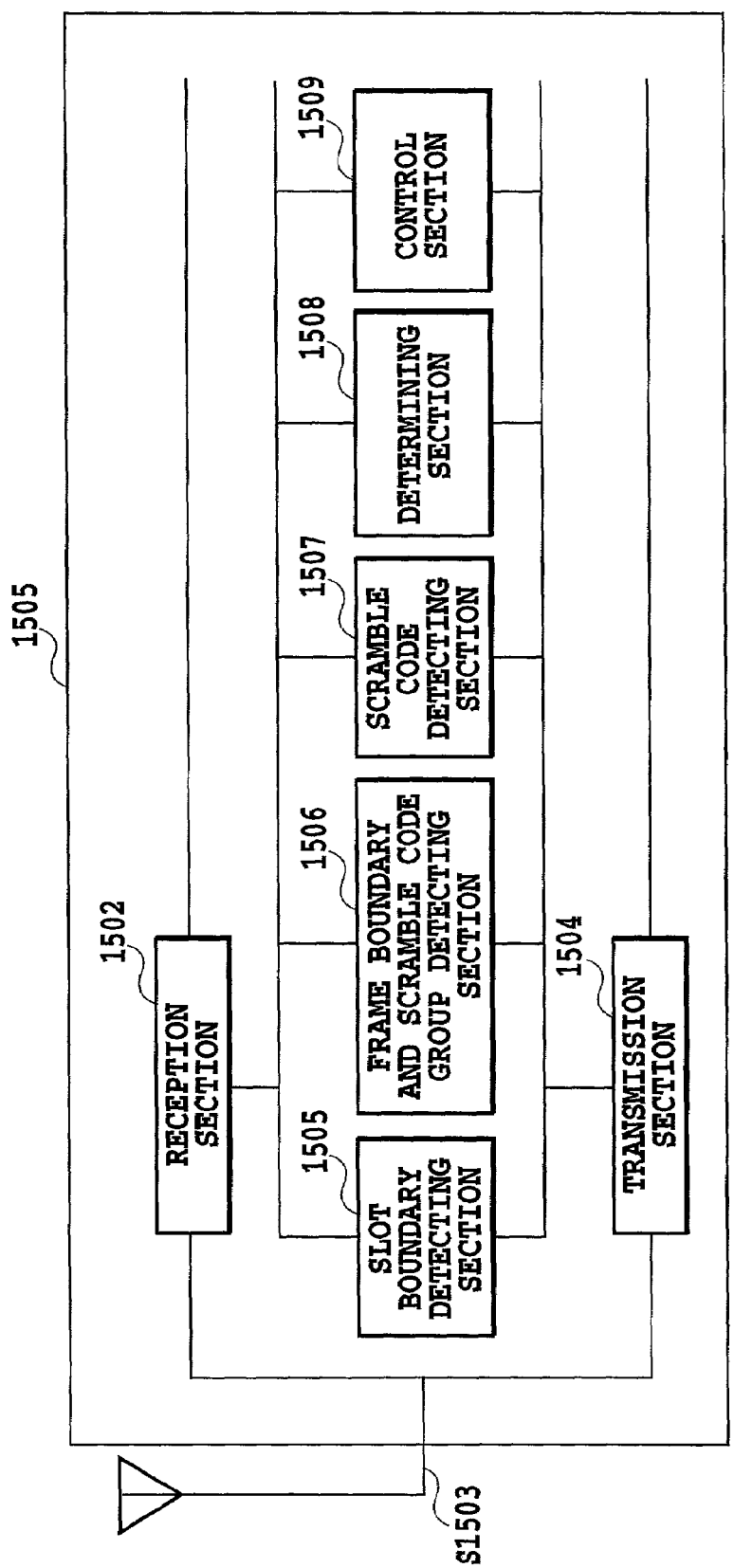
FIG. 15 is a block diagram showing the functional configuration of a mobile station to which the present invention has been applied.

FIG. 15 shows an example of the functional configuration of a mobile station to which the present invention has been applied. A mobile station 1501 is composed of at least an antenna 1503, a reception section 1502, a transmission section 1504, a slot boundary detecting section 1505, a frame boundary and scramble code group detecting section 1506, a scramble code detecting section 1507, a determining section 108, and a control section 1509.

The reception section 1502 receives a radio signal from an exterior via the antenna 1503. The slot boundary detecting section 1505 averages the received signal over a plurality of slots, and then selects a timing with which the average correlation value is largest, to detect slot boundaries. The frame boundary and scramble code group detecting section 1506 averages correlation values, and selects a timing and an SSC spreading code sequence with which the average correlation value is largest, to detect frame boundaries and a scramble code group in the received signal.

The scramble code detecting section 1507 detects which scramble code of the detected scramble code group is used in the signal. The determining section 1508 determines whether or not the detected frame boundaries and scramble code are correct. The transmission section 1504 transmits a radio signal via the antenna 1503.

The control section 1509 controls each block to execute processing relating to the present invention. For example, while the frame boundary and scramble code group detecting section 1506 or the scramble code detecting section 1507 is executing a process using the slot boundaries (first slot boundaries) detected by the slot boundary detecting section 1505, the control section 1509 causes the slot boundary detecting section 1505 to detect new slot boundaries (second slot boundaries) concurrently with the above process. Then, if the determining section 1508 determines the incorrectness of the frame boundaries or the scramble code, the control section 1509 causes the frame boundary and scramble code group detecting section 1506 to detect frame boundaries and a scramble code group on the basis of the second slot boundaries.

Further, if the detected second slot boundaries are different from the first slot boundaries or past second slot boundaries detected during the last cell search, then the control section 1509 suspends the detecting process executed by the frame boundary and scramble code group detecting section 1506 or the scramble code detecting section 1507, and detects the frame boundaries and the scramble code group on the basis of new detected second slot boundaries.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A cell search method for a mobile station in a mobile communication system, the method being characterized said repeating by comprising steps of:
despreading a received signal with a spreading code common to all slots and detecting first slot boundaries on the basis of a first average correlation value calculated at intervals of first averaging time;
despreading said received signal with different spreading codes for said respective slots on the basis of the detected first slot boundaries and detecting frame boundaries and a scramble code group on the basis of a second average correlation value;
descrambling a common pilot signal on the basis of said detected frame boundaries and scramble code group, and detecting a scramble code on the basis of a third average correlation value;
detecting, concurrently with the step of detecting said frame boundaries and said scramble code group or the step of detecting said scramble code, second slot boundaries on the basis of a fourth average correlation value calculated through primary averaging executed at intervals of second averaging time;
determining whether or not the detected frame boundaries and scramble code are correct; and
repeating the process starting from the step of detecting said frame boundaries and said scramble code group on the basis of said detected second slot boundaries, if the incorrectness of said frame boundaries or said scramble code is determined, including: comparing the time elapsed since the start of the step of detecting said first slot boundaries with a predetermined upper limit value and ending the repetition if it is determined as a result of the comparison that said elapsed time exceeds said upper limit value.

2. A cell search method for a mobile station in a mobile communication system, the method being characterized by comprising steps of:
despreading a received signal with a spreading code common to all slots and detecting first slot boundaries on the basis of a first average correlation value calculated at intervals of first averaging time;
despreading said received signal with different spreading codes for said respective slots on the basis of the detected first slot boundaries and detecting frame boundaries and a scramble code group on the basis of a second average correlation value;
descrambling a common pilot signal on the basis of said detected frame boundaries and scramble code group, and detecting a scramble code on the basis of a third average correlation value;
detecting, concurrently with the step of detecting said frame boundaries and said scramble code group or the step of detecting said scramble code, second slot boundaries on the basis of a fourth average correlation value calculated through primary averaging executed at intervals of second averaging time;
determining whether or not the detected frame boundaries and scramble code are correct; and
repeating the process starting from the step of detecting said frame boundaries and said scramble code group on the basis of said detected second slot boundaries, if the incorrectness of said frame boundaries or said scramble code is determined, including: comparing the number of times that said frame boundaries and said scramble code have been detected with a predetermined upper limit value and ending the repetition if it is determined as a result of the comparison that said number of times exceeds said upper limit value.

3. A cell search method for a mobile station in a mobile communication system, the method being characterized by comprising steps of:
despreading a received signal with a spreading code common to all slots and detecting first slot boundaries on the basis of a first slot average correlation value calculated at intervals of first averaging time;
despreading said received signal with different spreading codes for said respective slots on the basis of the detected first slot boundaries and detecting frame boundaries and a scramble code group on the basis of a second average correlation value;

descrambling a common pilot signal on the basis of said detected frame boundaries and scramble code group, and detecting a scramble code on the basis of a third average correlation value;

detecting, concurrently with the step of detecting said frame boundaries and said scramble code group or the step of detecting said scramble code, second slot boundaries on the basis of a fourth average correlation value calculated through primary averaging executed at intervals of second averaging time, including: calculating a fifth average correlation value by executing secondary averaging on the basis of said first average correlation value and said already calculated fourth average correlation value, and detecting second slot boundaries on the basis of the calculated fifth average correlation value;

determining whether or not the detected frame boundaries and scramble code are correct; and repeating the process starting from the step of detecting said frame boundaries and said scramble code group on the basis of said detected second slot boundaries, if the incorrectness of said frame boundaries or said scramble code is determined.

4. The cell search method according to any one of claims 1–3, characterized in that said second averaging time is different from said first averaging time.

5. The cell search method according to claim 4, characterized in that first averaging time is longer than said second averaging time.

6. The cell search method according to claim 5, characterized in that said secondary averaging is a process of carrying out averaging after weighting said first average correlation value and said already calculated fourth average correlation value.

7. The cell search method according to claim 6, characterized in that said weighting values are adaptively different from each other.

8. The cell search method according to claim 7, characterized in that said weighting value becomes smaller for said first average correlation value more previously calculated relative to the time of the secondary averaging.

9. The cell search method according to claim 8, characterized in that a decreasing rate of said weighting value becomes relatively higher according to a movement speed of said mobile station.

10. The cell search method according to claim 5, characterized in that said secondary averaging is a process of carrying out averaging after multiplying said first average correlation value and said already calculated fourth average correlation value by respective forgetting factors.

11. The cell search method according to claim 10, characterized in that values of said forgetting factors are adaptively different from each other.

12. The cell search method according to claim 11, characterized in that the value of said forgetting factor decreases consistently with the movement speed of said mobile station.

13. A cell search method for a mobile station in a mobile communication system, the method being characterized by comprising steps of:

despreading a received signal with a spreading code common to all slots and detecting first slot boundaries on the basis of a first average correlation value calculated at intervals of first averaging time;

despreading said received signal with different spreading codes for said respective slots on the basis of the detected first slot boundaries and detecting frame boundaries and a scramble code group on the basis of a second average correlation value;

descrambling a common pilot signal on the basis of said detected frame boundaries and scramble code group, and detecting a scramble code on the basis of a third average correlation value;

detecting, concurrently with the step of detecting said frame boundaries and said scramble code group or the step of detecting said scramble code, second slot boundaries on the basis of a fourth average correlation value calculated through primary averaging executed at intervals of second averaging time;

determining whether or not the detected frame boundaries and scramble code are correct;

repeating the process starting from the step of detecting said frame boundaries and said scramble code group on the basis of said detected second slot boundaries, if the incorrectness of said frame boundaries or said scramble code is determined; and determining a state of said mobile station, wherein said repeating step is executed if at the step of determining the state, it is determined that said mobile station is communicating.

14. A cell search method for a mobile station in a mobile communication system, the method being characterized by comprising steps of:

despreading a received signal with a spreading code common to all slots and detecting first slot boundaries on the basis of a first average correlation value calculated at intervals of first averaging time;

despreading said received signal with different spreading codes for said respective slots on the basis of the detected first slot boundaries and detecting frame boundaries and a scramble code group on the basis of a second average correlation value;

descrambling a common pilot signal on the basis of said detected frame boundaries and scramble code group, and detecting a scramble code on the basis of a third average correlation value;

detecting, concurrently with the step of detecting said frame boundaries and said scramble code group or the step of detecting said scramble code, second slot boundaries on the basis of a fourth average correlation value calculated through primary averaging executed at intervals of second averaging time; and suspending the step of detecting said frame boundaries and said scramble code group or the step of detecting said scramble code and repeating the process starting from the step of detecting said frame boundaries and said scramble code group on the basis of said second slot boundaries detected during a present search, if the detected second slot boundaries are different from said second slot boundaries detected during a last cell search.

15. The cell search method according to claim 14, characterized in that said second averaging time is different from said first averaging time.

16. The cell search method according to claim 15, characterized in that said first averaging time is longer than said second averaging time.

17. The cell search method according to claim 14, characterized in that said repeating step includes a step of comparing the time elapsed since the start of the step of detecting said first slot boundaries with a predetermined upper limit value and ending the repetition if it is determined as a result of the comparison that said elapsed time exceeds said upper limit value.

18. The cell search method according to claim 14, characterized in that said repeating step includes a step of comparing the number of times that said frame boundaries and said scramble code have been detected with a predetermined upper limit value and ending the repetition if it is determined as a result of the comparison that said number of times exceeds said upper limit value.

19. The cell search method according to claim 14, characterized in that the step of detecting said second slot boundaries comprises calculating a fifth average correlation value by executing secondary averaging on the basis or said first average correlation value and said already calculated fourth average correlation value, and detecting second slot boundaries on the basis of the calculated fifth average correlation value.

20. The cell search method according to claim 19, characterized in that said secondary averaging is a process of carrying out averaging after weighting said first average correlation value and said already calculated fourth average correlation value.

21. The cell search method according to claim 20, characterized in that said weighting values are adaptively different from each other.

22. The cell search method according to claim 21, characterized in that said weighting value becomes smaller for said first average correlation value the more previously is calculated relative to the time of the secondary averaging.

23. The cell search method according to claim 22, characterized in that a decreasing rate of said weighting value becomes relatively higher according to a movement speed of said mobile station.

24. The cell search method according to claim 19, characterized in that said secondary averaging is a process of carrying out averaging after multiplying said first average correlation value and said already calculated fourth average correlation value by respective forgetting factors.

25. The cell search method according to claim 24, characterized in that values of said forgetting factors are adaptively different from each other.

26. The cell search method according to claim 25, characterized in that the value of said forgetting factor decreases consistently with the movement speed of said mobile station.

27. The cell search method according to claim 14, characterized by further comprising a step of determining a state of said mobile station, and said repeating step is executed if at the step of determining the state, it is determined that said mobile station is communicating.

28. A mobile station in a mobile communication system, the station characterized by comprising;
means for despreading a received signal with a spreading code common to all slots and detecting first slot boundaries on the basis of a first average correlation value calculated at intervals of first averaging time.
means for despreading said received signal with different spreading codes for said respective slots on the basis of the detected first slot boundaries and detecting frame boundaries and a scramble code group on the basis of a second average correlation value;
means for descrambling a common pilot signal on the basis of the detected frame boundaries and scramble code group, and detecting a scramble code on the basis of a third average correlation value;
means for detecting second slot boundaries on the basis of a fourth average correlation value calculated by subjecting said received signal to primary averaging at intervals of second averaging time;
means for determining whether or not said detected frame boundaries and scramble code are correct, wherein if the determining means determines the incorrectness of said frame boundaries or said scramble code, the means for detecting said frame boundaries and said scramble code group detects said frame boundaries and said scramble code group on the basis of said detected second slot boundaries; and
means for comparing the time elapsed since the start of the step of detecting said first slot boundaries with a predetermined upper limit value and ending the detection of said frame boundaries and said scramble code if it is determined as a result of the comparison that said elapsed time exceeds said upper limit value.

29. A mobile station in a mobile communication system, the station characterized by comprising:
means for despreading a received signal with a spreading code common to all slots and detecting first slot boundaries on the basis of a first average correlation value calculated at intervals of first averaging time;
means for despreading said received signal with different spreading codes for said respective slots on the basis of the detected first slot boundaries and detecting frame boundaries and a scramble code group on the basis of a second average correlation value;
means for descrambling a common pilot signal on the basis of the detected frame boundaries and scramble code group,and detecting a scramble code on the basis of a third average correlation value;
means for detecting second slot boundaries on the basis of a fourth average correlation value calculated by subjecting said received signal to primary averaging at intervals of second averaging time;
means for determining whether or not said detected frame boundaries and scramble code are correct, wherein if the determining means determines the incorrectness of said frame boundaries or said scramble code, the means for detecting said frame boundaries and said scramble code group detects said frame boundaries and said scramble code group on the basis of said detected second slot boundaries; and
means for comparing the number of times that said frame boundaries and said scramble code have been detected with a predetermined upper limit value and ending the detection of said frame boundaries and said scramble code if it is determined as a result of the comparison that said number of times exceeds said upper limit value.

30. A mobile station in a mobile communication system, the station characterized by comprising:
means for despreading a received signal with a spreading code common to all slots and detecting first slot boundaries on the basis of a first average correlation value calculated at intervals of first averaging time.
means for despreading said received signal with different spreading codes for said respective slots on the basis of the detected first slot boundaries and detecting frame boundaries and a scramble code group on the basis of a second average correlation value;
means for descrambling a common pilot signal on the basis of the detected frame boundaries and scramble code group, and detecting a scramble code on the basis of a third average correlation value;
means for detecting second slot boundaries on the basis of a fourth average correlation value calculated by subjecting said received signal to primary averaging at intervals of second averaging time; and means for determining whether or not said detected frame boundaries and scramble code are correct, wherein if the determining means determines the incorrectness of said frame boundaries or said scramble code, the means for detecting said frame boundaries and said scramble code group detects said frame boundaries and said scramble code group on the basis of said detected second slot boundaries, and wherein said means for detecting said second slot boundaries calculates a fifth average correlation value by executing secondary averaging on the basis of said first average correlation value and said already calculated fourth average correlation value, and detects second slot boundaries on the basis of the calculated fifth average correlation value.

31. The mobile station according to any one of claims 28–30, characterized in that said second averaging time is different from said first averaging time.

32. The mobile station according to claim 31, characterized in that said first averaging time is longer than said second averaging time.

33. The mobile station according to claim 32, characterized in that said secondary averaging is a process of carrying out averaging after weighting said first average correlation value and said already calculated fourth average correlation value.

34. The mobile station according to claim 33, characterized in that said weighting values are adaptively different from each other.

35. The mobile station according to claim 34, characterized in that said weighting value becomes smaller for said first average correlation value the more previously is calculated relative to the time of the secondary averaging.

36. The mobile station according to claim 35, characterized in that a decreasing rate of said weighting value becomes relatively higher according to a movement speed of said mobile station.

37. The mobile station according to claim 32, characterized in that said secondary averaging is a process of carrying out averaging after multiplying said first average correlation value and said already calculated fourth average correlation value by respective forgetting factors.

38. The mobile station according to claim 37, characterized in that values of said forgetting factors are adaptively different from each other.

39. The mobile station according to claim 38, characterized in that the value of said forgetting factor decreases consistently with the movement speed of said mobile station.

40. A mobile station in a mobile communication system, the station characterized by comprising:
    means for despreading a received signal with a spreading code common to all slots and detecting first slot boundaries on the basis of a first average correlation value calculated at intervals of first averaging time,
    means for despreading said received signal with different spreading codes for said respective slots on the basis of the detected first slot boundaries and detecting frame boundaries and a scramble code group on the basis of a second average correlation value;
    means for descrambling a common pilot signal on the basis of the detected frame boundaries and scramble code group, and detecting a scramble code on the basis of a third average correlation value;
    means for detecting second slot boundaries on the basis of a fourth average correlation value calculated by subjecting said received signal to primary averaging at intervals of second averaging time; and
    means for determining whether or not said detected frame boundaries and scramble code are correct;
    wherein if the determining means determines the incorrectness of said frame boundaries or said scramble code, the means for detecting said frame boundaries and said scramble code group detects said frame boundaries and said scramble code group on the basis of said detected second slot boundaries, and
    wherein said determining means execute said determination if said mobile station is communicating.

41. A mobile station in a mobile communication system, the station being characterized by comprising:
    means for despreading a received signal with a spreading code common to all slots and detecting first slot boundaries on the basis of a first average correlation value calculated at intervals of first averaging time;
    means for despreading said received signal with different spreading codes for said respective slots on the basis of the detected first slot boundaries and detecting frame boundaries and a scramble code group on the basis of a second average correlation value;
    means for descrambling a common pilot signal on the basis of said detected frame boundaries and scramble code group, and detecting a scramble code on the basis of a third average correlation value;
    means for detecting second slot boundaries on the basis of a fourth average correlation value calculated through primary averaging executed at intervals of second averaging time; and
    means for suspending the detection by the means for detecting said frame boundaries and said scramble code group or the means for detecting said scramble code, and detecting said frame boundaries and said scramble code group on the basis of said detected second slot boundaries, if said detected second boundaries are different from said first slot boundaries or said second slot boundaries detected during a last cell search.

42. The mobile station according to claim 41, characterized in that said second averaging time is different from said first averaging time.

43. The mobile station according to claim 42, characterized in that said first averaging time is longer than said second averaging time.

44. The mobile station according to claim 41, characterized by further comprising means for comparing the time elapsed since the start of the step of detecting said first slot boundaries with a predetermined upper limit value and ending the detection of said frame boundaries and said scramble code if it is determined as a result of the comparison that said elapsed time exceeds said upper limit value.

45. The mobile station according to claim 41, characterized by further comprising means for comparing the number of times that said frame boundaries and said scramble code have been detected with a predetermined upper limit value and ending the detection of said frame boundaries and said scramble code if it is determined as a result of the comparison that said number of times exceeds said upper limit value.

46. The mobile station according to claim 41, characterized in that the means for detecting said second slot boundaries calculates a fifth average correlation value by executing secondary averaging on the basis of said first average correlation value and said already calculated fourth average correlation value, and detects second slot boundaries on the basis of the calculated fifth average correlation value.

47. The mobile station according to claim 46, characterized in that said secondary averaging is a process or carrying out averaging after weighting said first average correlation value and said already calculated fourth average correlation value.

48. The mobile station according to claim 47, characterized in that said weighting values are adaptively different from each other.

49. The mobile station according to claim 48, characterized in that the said weighting value becomes smaller for said first average correlation value the more previously calculated relative to the time of the secondary averaging.

50. The mobile station according to claim 49, characterized in that a decreasing rate of said weighting value becomes relatively higher according to a movement speed of said mobile station.

51. The mobile station according to claim 46, characterized in that said secondary averaging is a process of carrying out averaging after multiplying said first average correlation value and said already calculated fourth average correlation value by respective forgetting factors.

52. The mobile station according to claim 51, characterized in that values of said forgetting factors are adaptively different from each other.

53. The mobile station according to claim 52, characterized in that the value of said forgetting factor decreases consistently with the movement speed of said mobile station.

54. The mobile station according to claim 41, characterized in that said determining means execute said determination if said mobile station is communicating.

* * * * *